Figure 1:
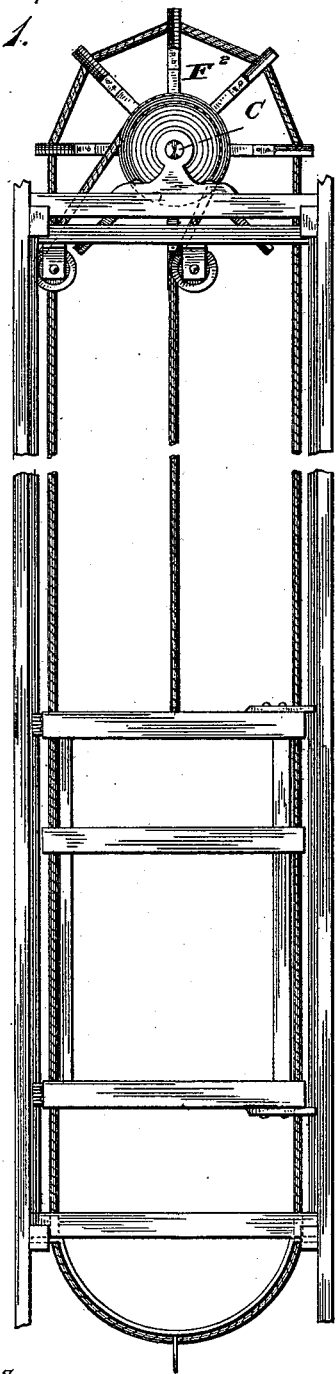

(No Model.) 3 Sheets—Sheet 1.

A. SEDGWICK.
MECHANISM FOR CONTROLLING MOTION.

No. 536,584. Patented Mar. 26, 1895.

(No Model.) 3 Sheets—Sheet 2.

A. SEDGWICK.
MECHANISM FOR CONTROLLING MOTION.

No. 536,584. Patented Mar. 26, 1895.

Witnesses
Harry King
L. Parker Farrington.

Inventor:
Alonzo Sedgwick
By Irving Ulring
Attorney (No Model.) 3 Sheets—Sheet 3.

A. SEDGWICK.
MECHANISM FOR CONTROLLING MOTION.

No. 536,584. Patented Mar. 26, 1895.

Witnesses.
Harry King
L. Parker Farrington.

Inventor.
Alonzo Sedgwick
By Irving Ulray
Attorney.

UNITED STATES PATENT OFFICE.

ALONZO SEDGWICK, OF POUGHKEEPSIE, NEW YORK, ASSIGNOR TO ANNIE B. SEDGWICK, OF SAME PLACE.

MECHANISM FOR CONTROLLING MOTION.

SPECIFICATION forming part of Letters Patent No. 536,584, dated March 26, 1895.

Application filed August 14, 1894. Serial No. 520,249. (No model.)

*To all whom it may concern:*

Be it known that I, ALONZO SEDGWICK, a citizen of the United States, residing at Poughkeepsie, in the county of Dutchess and State of New York, have invented certain new and useful Improvements in Mechanism for Controlling Motion; and I do hereby declare the following to be a full, clear, and exact description of the invention, such as will enable others skilled in the art to which it appertains to make and use the same.

My invention relates to improvements in mechanism for controlling motion, designed more especially for elevators, dumb waiters and similar machines.

The form of wheel shown in the drawings accompanying this specification is the same as that described and claimed in my application now pending in the United States Patent Office, filed July 28, 1894, and serially numbered 518,848; and this present application refers only to the novel construction of the mechanism for controlling motion, which may be used in connection with wheels of various forms.

In similar mechanism heretofore designed for this purpose the adjustment of the machine for the proper working of the mechanism depended entirely upon the spring-coil being made more or less smaller than the fixed straight sleeve against which it operated without any means of taking up the wear of the different parts, or any means of adjusting a special machine to the particular load or duty required of it.

The object therefore of my invention is, first, to provide means of adjustment of the spring-coil to the fixed sleeve or box without more frictional contact of these parts than is necessary for the duty required in each special case; second, to take up the wear occasioned by use of the spring and sleeve as the service may require; third, to provide means of attaching securely the different parts together so as to safely withstand the constant shock to which the mechanism is subjected in the sudden arresting of the load, occasioned by the intermittent manner in which such machines are generally used; fourth, to provide means for reducing the friction of the working parts as much as possible, differing in this respect from most machines of this class that depend in a measure upon the friction of the working parts to hold the load at any desired point, and, fifth, to provide a machine of this description that shall be simple and strong of construction, easy running, durable in service and comparatively inexpensive to manufacture. I attain these objects by means of certain features of construction and combination of parts which will be hereinafter fully described and claimed.

Figure 2:
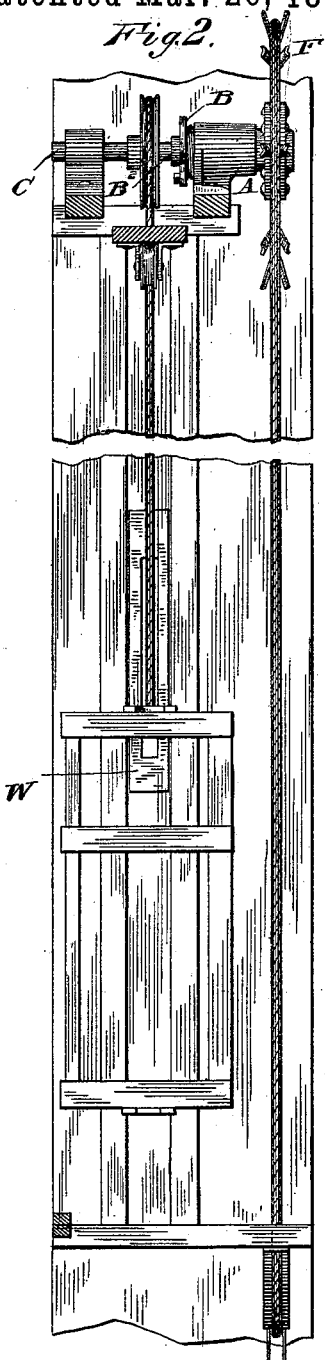
Figure 3:
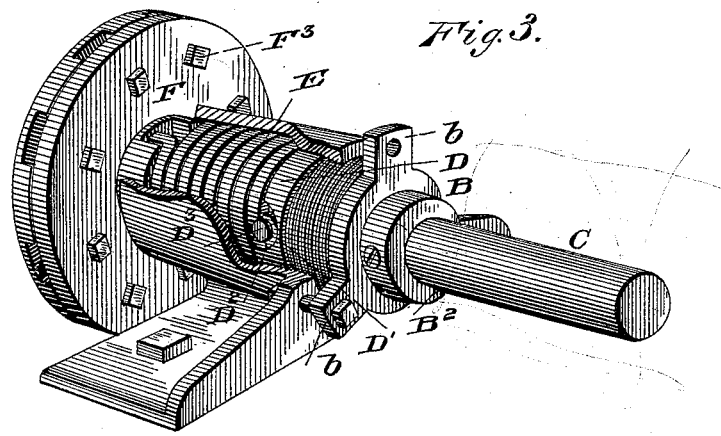
Figure 4:
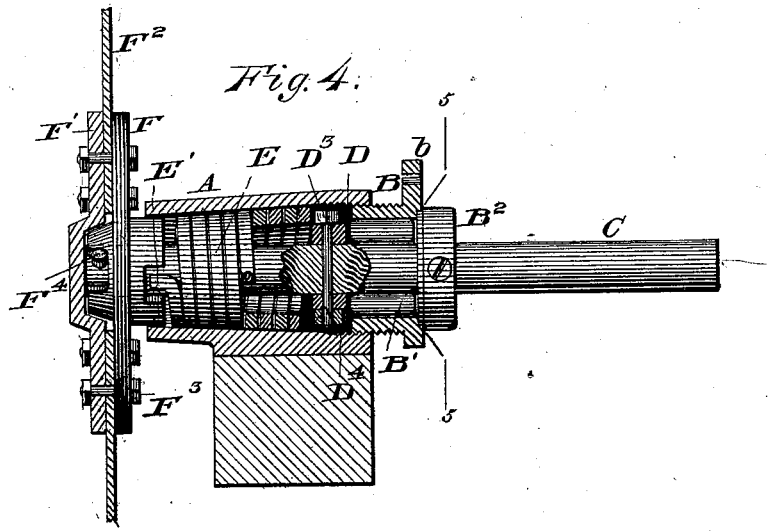
Figure 5:
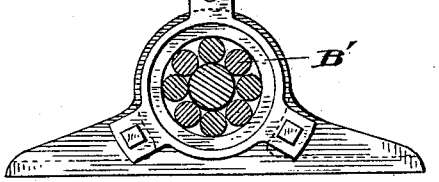
Figure 6:
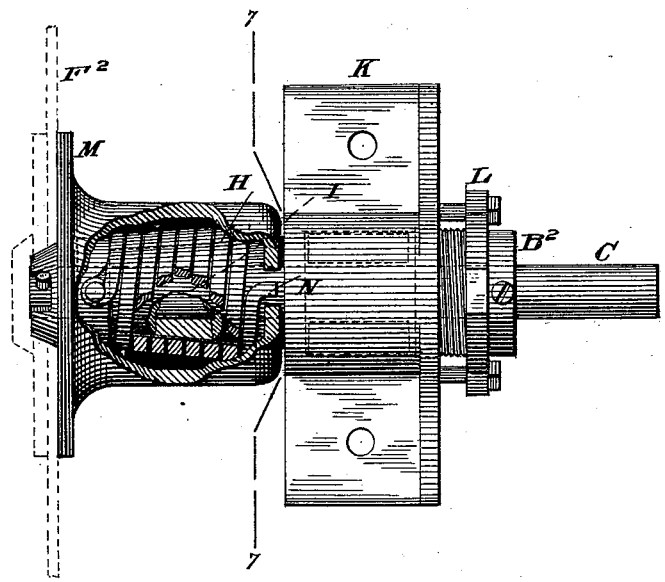
Figure 7:
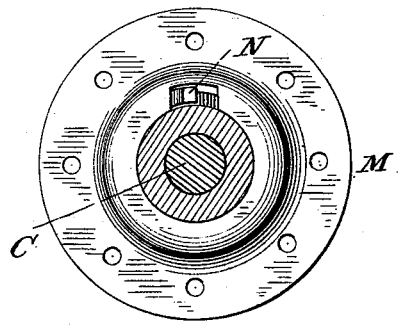

In the accompanying drawings, Figure 1 is a rear elevation of a dumb waiter to which the controlling mechanism is attached showing generally all the parts in position for use. Fig. 2, is a side elevation of the same showing more especially the relative position of the controlling mechanism. Fig. 3 is an enlarged perspective view of the controlling mechanism with only the box in section, showing a tapering spring-coil interposed between a shaft and a fixed tapering box, the tapering spring-coil being adapted to expand and automatically clutch the box, and release itself on the advance and on the return of the driving power, and also showing means of adjustment of the spring to the load or duty required. Fig. 4 is a detailed central, longitudinal section of the same mechanism, with shaft, collar, spring-coil and wheel-hub shown in side elevation. Fig. 5, is a vertical cross-section of the roller bearings on the line 5—5 of Fig. 4. Fig. 6 is a side elevation of a modification of the controlling mechanism with portions in section showing a tapering spring-coil attached to a shaft and encircling a fixed tapering sleeve, and adapted automatically to clutch the sleeve and release itself on the advance and on the return of the driving power; and made adjustable to the duty required by means of an adjusting nut and collar; and Fig. 7 is a vertical cross-section of the same modification through the line 7—7, of Fig. 6.

In the drawings, A, denotes the tapering box or sleeve with a base or lugs to secure it in position. The rear end of the sleeve is made straight and threaded and into it is screwed the adjusting nut B. This nut B is provided with lugs *b*, and bolts *c* which pass through corresponding holes in A and *b*, for holding the nut B in place after adjustment.

The adjusting nut B is bored larger than the shaft C, the intermediate space being filled with rollers B' of a suitable size to just encircle the shaft C, forming a roller bearing for the machine, to reduce the friction and take the weight of the load from the other parts.

The collar $B^2$ not only keeps the rollers in place, but holds the adjusting nut B in position on the shaft C and against the collar D, which is fitted to the shaft C and has a recess or seat at D' accurately fitting the eye $D^2$ formed on the large end of the tapering spring-coil E. Through the eye $D^2$ and corresponding holes in the collar D and shaft C a bolt $D^3$ is driven, and secured by a nut $D^4$ thus holding the shaft C, collar D and tapering spring-coil E firmly together. Additional strength and firmness are also secured because the end thrust of the coil-spring E is sustained by means of the eye $D^2$ having its seat in the collar D.

The tapering spring-coil E is accurately fitted to the tapering form of the sleeve A, the smaller end of the spring having a lug E' working in a recess formed in the hub of the flange F which, with the cover F', the spokes $F^2$ and the bolts $F^3$ form the hand wheel through which power is applied to the machine. The front hub of the flange F is also provided with a slot or recess into which works a pin $F^4$. This is driven through a hole in shaft C, and by means of it direct connection is made between the driving power and the shaft and the load on the shaft is sustained or moved.

The operation of the controlling mechanism is as follows: The shaft C, the tapering spring-coil E, its collar D, with the adjusting nut B and rollers B' held in place by the collar $B^2$ are slipped into the tapering sleeve A and are adjusted by the nut B being screwed into the sleeve A until the spring-coil E sufficiently grasps the sleeve, when they are secured together by the bolts c. On the hand wheel being turned to the right the hub on the flange F engages with the pin $F^4$ as is clearly shown in Fig. 4, thus turning the shaft C. This tends to coil the spring from the larger end and releases the spring from the sleeve A, so that the shaft may work freely and the load be raised, without friction of these parts, the load being sustained by the roller bearing B' and moving easily upon it. On releasing the hand wheel the spring E resumes its position, being assisted by the weight of the load, which tends to expand the spring into the sleeve A. The greater the load the tighter it is held in the sleeve A by means of the accumulated grip of the different coils forming the spring. In turning the hand wheel to the left the action is reversed, the wheel turning on the shaft C until the lug E' on the small end of the spring-coil is brought in contact with the hub of the flange F at E', coiling the spring from that end, releasing it from the sleeve, and allowing the shaft to turn and the load to be lowered. In this construction it will be seen that the strain on the spring by reason of the shock caused especially in lowering the load, is less liable to injure the spring-coil because the end thrust is firmly sustained by the position of the eye $D^2$ in the seat of the collar D, and also by the expansion of the coil against the tapering sleeve A which is firmly bolted in place. By duplicating these parts it will be readily seen that the mechanism can be made to hold the load both ways, but for simplicity and economy in cost of construction in elevator and similar work, it is preferable to make the machine right and left hand, the counter weight W being on the right or left hand as may be required.

Fig. 6 shows a modification of the controlling mechanism in which the tapering spring-coil H incloses a tapering fixed sleeve I, the sleeve being attached to or forming a part of the box K with an adjusting nut and roller bearing, substantially in the same way as is shown in Figs. 3 and 4. In this construction the small end of the spring-coil is attached to the shaft in a similar manner to that heretofore described, the spring-coil being adjusted to the fixed sleeve by screwing the adjusting nut L out of the box K, until the spring H clasps the tapering sleeve I, the extension of M, the flange of the hand wheel, forming a cover for the mechanism but not sustaining the pressure or supporting the spring as in the device shown in Figs. 3 and 4. The large end of the spring has a lug N working in a recess located in the rear end of the cover M, as shown in Fig. 7, the operation being substantially as heretofore described.

I do not claim broadly a spring-coil operating within a sleeve or between a drum-shaft or drum and a fixed sleeve for the purpose of automatically releasing or gripping the sleeve, as such a coil has been shown in United States patent to W. J. Lane, No. 307,663, under which I now have sole right of manufacture; but What I do claim as my invention, and desire to secure by Letters Patent, is—

1. A mechanism for controlling motion, consisting of a tapering spring coil, a tapering fixed sleeve, against which the spring-coil operates, and means for attaching the coil to the shaft whereby the coil automatically grips the sleeve in one direction, and is released when turned in the other direction, as and for the purpose set forth.

2. A mechanism for controlling motion consisting of a shaft, a tapering fixed sleeve inclosing the shaft, a tapering spring-coil operating against the sleeve, means for adjusting the spring-coil in relation to the sleeve, and a bolt and eye seated in the recess of a stationary collar fixed upon the shaft for attaching coil to shaft, substantially as and for the purpose described.

3. In a mechanism for controlling motion, the combination of a tapering spring-coil, a corresponding fixed sleeve, means of attaching the coil to the shaft, and a threaded nut for adjusting the spring-coil in relation to the sleeve, substantially as described.

4. In a mechanism for controlling motion, the combination of a tapering spring-coil, a corresponding fixed sleeve, means of adjusting coil to sleeve, and of attaching the coil to the shaft, and roller bearings, operating between the shaft and a portion of the sleeve or box, to reduce the friction, substantially as described.

5. In a mechanism for controlling motion, the combination of a shaft, a wheel provided with a slotted hub operating to turn the shaft, a tapering sleeve inclosing the shaft and inner flange of the wheel-hub, a spring-coil formed to fit the tapering sleeve and having a free end engaging the inner slot of the wheel-hub and attached at the other end to the shaft by a bolt and eye seated in a recess of a stationary collar, a threaded nut adapted to screw within the rear end of the sleeve for adjusting the spring-coil to the sleeve, and roller bearings between the adjusting nut and the shaft, all as and for the purposes described.

In testimony whereof I affix my signature in presence of two witnesses.

ALONZO SEDGWICK.

Witnesses:
 MARTIN HEERMANCE,
 IRVING ELTING.